Patented Mar. 23, 1943

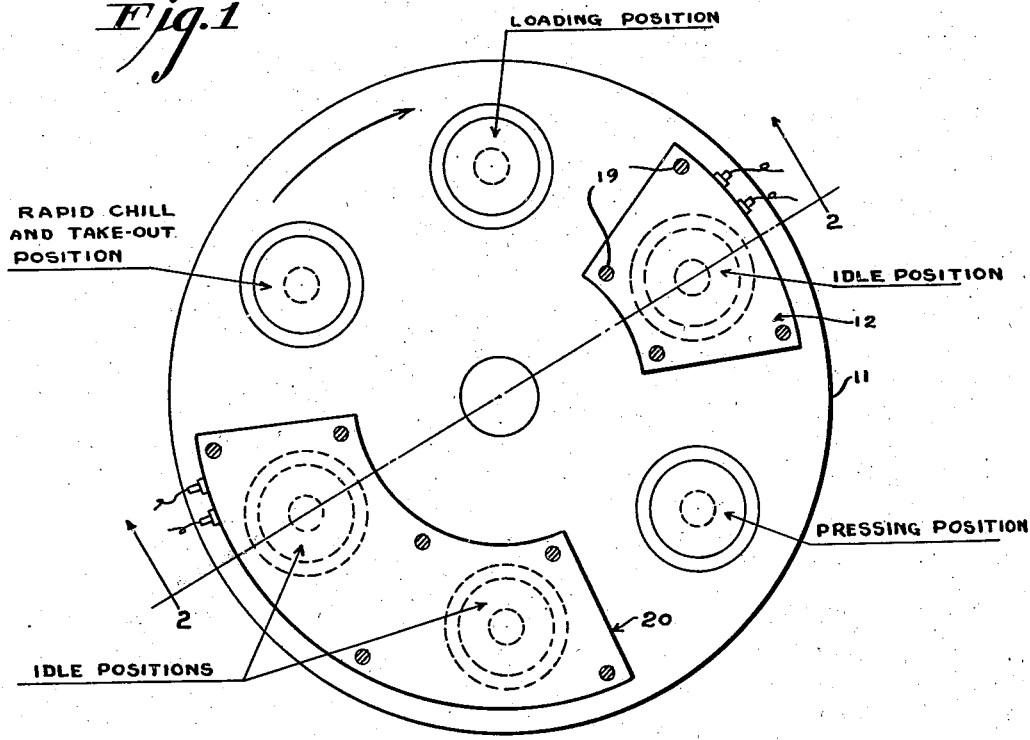
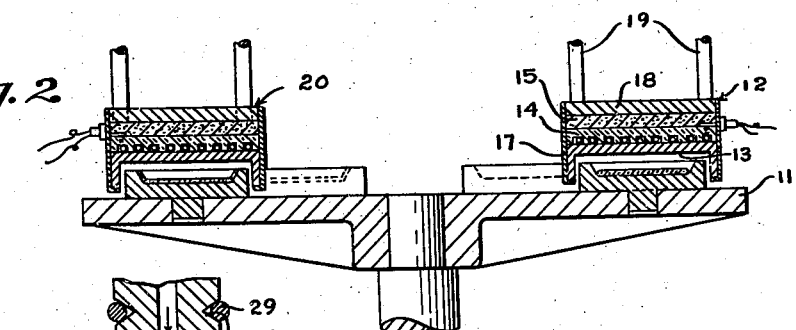
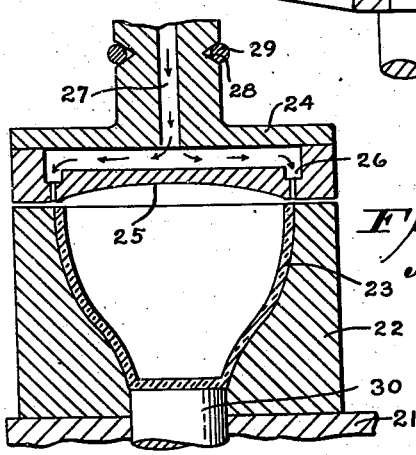

2,314,812

UNITED STATES PATENT OFFICE 2,314,812

METHOD OF MAKING GLASS ARTICLES

Henry H. Blau, Elmiro, N. Y., and Raymond W. Kell, Charleroi, Pa., assignors to Corning Glass Works, Corning, N. Y., a corporation of New York Application March 7, 1940, Serial No. 322,838

8 Claims. (Cl. 49—79)

Our invention relates to a glass working method and is particularly concerned with the improvement of the surface and/or opacity and color of glass articles.

It is quite often the practice to fabricate a glass article and to thereafter subject it to some form of heat treatment to improve its surface and in certain instances its opacity or color.

The prime object of our invention is the improvement of the surface appearance of a glass article coincident with its fabrication.

Another object is a method of fabricating and heat treating thermally opacifiable glass which produces articles having exceptional light reflecting qualities.

A further object is an improved method of fabricating and heat treating articles of glass compositions of the heat developed color type.

Other objects of our invention will become apparent from a further perusal of the specification and the accompanying drawing.

Our invention embodies the use of a device associated with a glass fabricating apparatus which transmits heat by reflection and/or radiation to a charge after being deposited in a mold and which tends to erase the effect produced on the charge by a severing apparatus. The heating action of such a device also prevents formation of surface skin on the charge prior to its being contacted by the pressing plunger enabling such plunger to impart a substantially strain-free inner ware surface thereto, thereby reducing strain release breakage prior to annealing.

Our invention also embodies the use of a similar device which transmits heat to an article immediately after fabrication and while still in the mold, for a sufficient time period to improve the surface appearance and/or optical qualities of the article irrespective of the character of glass of which it is composed, the opacity and light reflective quality when thermally opacifiable glass is employed, and similarly improves the color of articles composed of other glasses of the heat developed color type. Also, the action of such devices tends to lower the temperature gradient in the ware while in the mold, which brings about a better strain distribution in the glass thereby further reducing the danger of strain release breakage prior to annealing and the time involved therein.

For the purpose of teaching the present invention, the same has been illustrated as applied to a conventional form of press wherein a plurality of molds are arranged on a rotating table, although the invention may as well be applied to other forms of multimold glass presses.

Fig. 1 of the accompanying drawing is a plan view of the table and molds of a six mold rotating table press having our invention embodied therein;

Fig. 2 is a sectional view on lines 2—2 of Fig. 1; and

Fig. 3 illustrates, in sectional elevation, a modified form of apparatus embodying our invention.

Referring to Figs. 1 and 2, a heat reflecting unit, generally designated 12, comprises a heat reflecting plate 13 provided with an electric heating unit 14 having a backing 15 of thermal insulation. The parts 12—15 are held within a sheet metal sleeve 17 attached to a support 18 arranged over an idle position occupied by a mold immediately subsequent to its receipt of a charge of glass. The support 18 is suspended from above by suitable rods 19.

The heating unit 14 is not an essential feature of the reflecting unit, but may be employed to store heat in the reflecting plate prior to the commencement of pressing operations so that the first pieces of ware made will have the benefit of heat imparted to them by radiation from the heat reflecting plate as well as by reflection, or to increase the amount of heat directed into the glass by the reflecting unit 12 throughout an operating run.

A second heat reflecting unit 20 is arranged over those mold positions intermediate those at which pressing and take-out of pressed articles occurs. The latter unit is of the same form of construction as that of unit 12 and functions in a similar manner to heat the surface of the finished article.

It has been found that by use of a heat reflecting unit 12, as above described, even without resorting to use of its heating element, sufficient heat is reflected back into the glass to substantially obliterate the shear marks, and to prevent formation of a skin on the surface of the charge while in the idle position where it tends to flatten out into a more perfect disc for free pressing.

By the use of the unit 20 sufficient heat is fed back into the finished articles to, in effect, fire polish them, making the subsequent step of fire polishing unnecessary. Also, the use of heat reflecting unit 20 further assists in the equalization of heat distribution in the molds, thereby prolonging their life. The reflecting units, by preventing radical temperature gradients in the ware while in the molds, enables them to more uniformly cool the article at all points of contact which, as hereinbefore mentioned, brings about a better strain distribution in the article. In the fabrication of thermally opacifiable and heat developed colored glass articles, equalization of heat distribution while in the molds produces better quality of ware in that the degree of opacity or color develops more uniformly over the entire surface of the article than occurs in conventional practice.

In the modified form of the invention illustrated in Fig. 3, the numeral 21 designates a fragment of a mold table which may be similar to the one illustrated in Figs. 1 and 2. Arranged on table 21 is an I. E. S. reflector mold 22 containing a reflector 23 in the position to which it is advanced immediately after the pressing operation and while another mold of the press (not shown) is receiving a charge. In the position shown the reflector is under the influence of a heat reflecting unit 24 in axial alignment with the reflector. The unit 24 has a reflecting surface 25 surrounded by a row of air supply apertures so located as to direct jets of air toward the line of juncture of the reflector and inner mold wall. Air is supplied from a suitable air chamber 26 supplied with air via the bore 27 in the stem of the unit 24. This unit 24 is supported from overhead in any suitable manner (not shown) and is grooved at 28 to accommodate a belt 29 by means of which it is rotated from a suitable power source (not shown).

In employing the foregoing arrangement a heat reflecting unit, such as 12 of Figs. 1 and 2, may or may not be employed, as desired. If such unit is employed, it functions in the manner already described and therefore needs no further discussion. In the fabrication of certain forms of ware such, for example, as an I. E. S. reflector commonly made of opacifiable glass, the surface finish and character of opacification determine its reflecting qualities. Such glass when pressed is wholly transparent, opacification occurring at a lower temperature. In conventional practice, this temperature is reached first by the surfaces of the reflector in contact with the mold, because these surfaces are quite rapidly chilled by dissipation of heat through the mold. It has been found that better results can be obtained, in conjunction with the use of a heat reflecting unit, by removing the reflector from contact with the mold to halt the rapid cooling of its outer surface and also so that the heat from the reflecting unit is enabled to penetrate more deeply into the reflector wall. It is to accomplish this that the provision has been made to direct streams of air toward the junction of the mold and reflector. These air streams function as wedges to free the reflector from the mold thus permitting a positive air pressure to build up between the mold and reflector to raise it from contact with the mold, thereby stopping conduction of heat from the glass into the mold and enabling the more effective action of the reflector unit. Also, as soon as there is any space between the mold and article, the mold, which may be chrome plated, functions as a heat reflecting surface and therefore assists rather than hinders the heat reflecting unit 24. Ware, which has been subjected to the action of the combination of heat reflecting units 12 and 24, because of removal of the ware from contact with the mold before the surface is materially chilled, contains a better balance of strain in the inner and outer surfaces of the article than is otherwise obtained, thereby reducing strain release breakage prior to the annealing treatment even more than is possible by use of the combination of heat reflector units 12 and 20.

Rotation of the unit 24 is not absolutely essential, but has been found to produce slightly better results than when the unit is held stationary. Also, results similar to those obtainable by use of the heat reflecting unit 24 may be obtained by substitution of a heat reflecting unit 20 for unit 24 and slightly raising the article from contact with the mold walls by means of its knock-out pin 30. The pneumatic raising of the article is preferable, however, as there is less danger of distortion of the article.

We claim:

1. The method of treating a glass article while it remains in the mold in which it has been formed, which includes exposing the inner surfaces of the article to a heat reflecting surface while slightly lifting the article out of direct contact with the mold surfaces so that such surfaces also function to reflect heat back into the article while it is cooling.

2. The method of treating a glass article while it remains in the mold in which it has been formed, which includes pneumatically lifting the article from direct contact with the mold surfaces so that such surfaces function to reflect heat radiated from the article back into the article while it is cooling.

3. The method of treating a glass article while it is in a forming mold and immediately after its formation, which includes subjecting the inner surfaces of the article to a heat treatment brought about by reflecting heat radiated by the article back into it and lifting the article from direct contact with the forming mold during such treatment to prevent heat loss from the article into the mold.

4. The method of fabrication of a glass article, which includes intercepting heat being radiated from a glass charge after its deposit in a forming mold, reflecting the intercepted heat back into the charge, forming the charge into an article of a desired shape, subjecting surfaces of the article to a heat treatment brought about by lifting the article from direct contact with the mold and subjecting the inner surface of the article to a heat treatment brought about by reflection of heat radiated by the article back into it from a suitable reflecting surface while its outer surfaces are similarly treated by heat radiated by the article and reflected back into it by the adjacent mold surfaces.

5. The method of treating a glass article while it remains in the mold in which it has been formed, which includes exposing the inner surfaces of the article to a heat reflecting surface while creating a crevice between the article and the adjacent mold surfaces so that the mold surfaces also function to reflect heat back into the article while it is cooling.

6. The method of treating a glass article while it remains in the mold in which it has been formed, which includes exposing the inner surfaces of the article to a heat reflecting surface while applying air to the line of juncture of the article and mold to rapidly create a crevice between the article and mold whereby the mold surface is enabled to function to reflect heat back into the article while it is cooling.

7. The method of treating a glass article while it remains in the mold in which it has been formed, which includes exposing the inner surfaces of the article to a heat reflecting surface while applying air to the line of juncture of the article and mold to accelerate the pulling away of the article from the mold surface which occurs by virtue of the difference in co-efficient of expansion of the article and mold whereby the mold surface is enabled to function to reflect heat back into the article while the article is still hot enough to be benefited by such reflected heat.

8. The method of treating a glass article while it remains in the mold in which it has been formed, which includes exposing the inner surfaces of the article to a heat reflecting surface, and simultaneously applying air jets to the line of juncture of the article and mold to accelerate the separation of the article from the mold surface by differential contraction of the article and mold and pneumatically to force the article still farther from the adjoining mold surface, whereby the mold surface is enabled to function to reflect heat back into the article while the article is still hot enough to be benefited by such reflected heat.

HENRY H. BLAU.
RAYMOND W. KELL.